A. WHITENACK.
Evaporating Pan.
No. 39,855.    Patented Sept. 8, 1863.
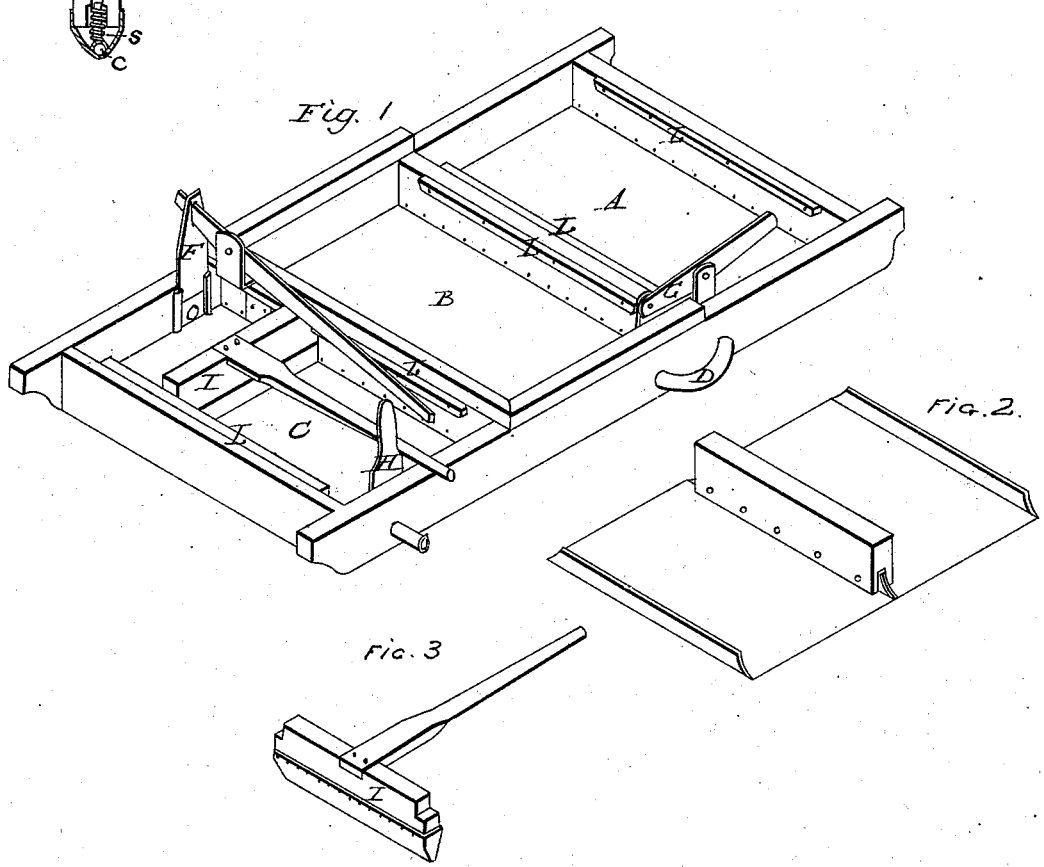
ATTEST.
O. F. Mayhew
Luther R. Martin
INVENTOR.
Abraham Whitenack

UNITED STATES PATENT OFFICE.

ABRAHAM WHITENACK, OF NORTH SALEM, INDIANA.

IMPROVEMENT IN SUGAR-EVAPORATORS.

Specification forming part of Letters Patent No. 39,855, dated September 8, 1863.

*To all whom it may concern:*

Be it known that I, ABRAHAM WHITENACK, of North Salem, county of Hendricks and State of Indiana, have invented new and useful Improvements in Sugar-Evaporators; and I do hereby declare that the following is a full and exact description thereof, reference being had to the accompanying drawings, making part of this specification, in which—

Figure 1 is a perspective view of the evaporator as it is designed to be set upon a brick-furnace. Fig. 2 is a representation of two of the sheet-metal bottoms of the evaporator, showing the mode of attaching them to the wooden partitions. Fig. 3 is a representation of the scraper or movable partition used for transferring the juice or sirup from one pan to another.

The nature of my invention consists in providing a scraper or movable partition, to be used in connection with sugar-evaporators, the several pans or compartments of which are arranged in such manner that the juice or sirup of one pan or compartment may be transferred to another by means of the scraper at the same time that the juice or sirup from a preceding pan is flowing into the pan being emptied behind the scraper, the object being to avoid the exposure of the bottom of an empty pan to the fire, so as to prevent scorching the sirup, and also to provide an easy and convenient mode of transferring the juice or sirup from one pan to another, as the process of evaporation progresses.

Similar letters of reference indicate corresponding parts in the several figures.

To enable others skilled in the art to make and use my invention, I will proceed to describe its construction and operation.

I construct the sides, ends, and partitions of my evaporator of wood, and the bottom of thin metal plates. The sides of the plates are turned up, as shown in Fig. 2, and firmly secured in a groove in the bottom of the end timbers and partitions. The ends of the plates are let into a groove near the bottom of the side timbers. Bent tubes D and E (the open end only of tubes E being shown under gate F) connect the compartments A B B C, through which the juice or sirup of one pan may be easily transferred to another.

The scraper or movable partition I, Figs. 1, 3, and 4, has its lower edge elastic, so that it may readily conform to any unevenness of the bottoms of the pans, which will prevent leaving any of the juice or sirup behind when the scraper is drawn through the pans in transferring from one pan to another. I usually make the lower edge of the scraper or movable partition elastic in the manner shown in Fig. 4, *s* being coiled springs let into holes bored in the lower edge of the wooden head of the scraper. Within the springs are small iron rods *r*, having small piece of thin metal riveted on their outer ends to be bent round and form a clamp to hold a cord, *c*, that passes along the outer ends of the pins, the ends of the cords being secured to the ends of the wooden head. A piece of cloth is then covered over the cord, pins, and springs, and is tacked or otherwise secured to the wooden head, the whole having the appearance indicated in Fig. 3.

Although I have thus briefly described a cheap and convenient mode of making the lower edge of the scraper elastic, any other mode of construction may be adopted that will accomplish the same object.

Strips or cleats L L L, &c., are fastened near the upper edge and on each side of the partitions and inside of the end timbers, as shown in Fig. 1, which serve to hold the scraper (the head of which is shouldered, as shown in Fig. 3, in order that it may pass under the cleats) with sufficient firmness against the bottom of the pan that the juice or sirup will not escape under it as it is drawn from one end of the pan to the other in transferring the juice or sirup to an adjoining pan.

Gates F and G are provided to close or open communication between pans A and B, B and C when desired; also gate H to close or open the outlet through which the sirup is drawn off into the cooler. The second compartment, B, being the one in which the principal part of the boiling is done, in order to prevent the scum or foam which rises in the process of boiling from flowing over into the last or finishing compartment, C, the partition between B and C and so much of the side timbers as forms the ends of compartment or pan B are raised somewhat, so that the scum or foam will flow back into compartment or pan A in the event that it should boil over, thus preventing any of the strong unpurified sirup from being mixed with that which is being finished off into molasses.

The method of using the evaporator is as follows: Compartment A is filled with the fresh juice of the cane and the other compartments filled with water. A fire is then kindled under the evaporator, under pan A. When the juice is boiled, skimmed, and cleared of impurities, the scraper is placed in the end of pan B, where the bent tube D connects pans A and B. Gates F and G being then opened, the scraper is pressed gently forward, forcing the water out of pan B into pan C, while the juice from pan A flows through bent tube D into pan B behind the scraper. Gate F is then closed and the scraper placed in the end of pan A, opposite the bent tube D, and drawn gently forward, so as to expel all the juice into pan B, green juice from a supply-tank at the same time flowing into pan A behind the scraper. Gate G is then closed and the scraper removed. The fire must now be kept up and the boiling done as rapidly as possible until the juice in pan B is reduced to about thirty or thirty-two degrees by the saccharometer, when it is ready to be transferred to pan C, to be finished off into molasses or sirup to be grained into sugar. The scraper is then placed in the end of pan C, opposite the outlet-gate H, which must now be raised, and also gate F. The scraper is then drawn down forward to expel the water from pan C. The sirup from pan B flows into pan C behind the scraper. Gate H must now be closed and the scraper placed in the end pan, B, near the bent tube, D. Gate G is then raised and the scraper pushed gently to the opposite end of the pan, to expel all the sirup from pan B into pan C. The juice from pan A flows into pan B behind the scraper, as before. Gate F is now closed, and the scraper is placed in pan A, opposite the bent tube D, and drawn gently forward to expel the juice from pan A to pan B, while fresh juice from the supply-tank is flowing into pan A behind the scraper. Gate G is now closed and the scraper removed ready to be used to draw off the sirup from pan C to the cooler. The same process is repeated until the supply of juice is exhausted, water being substituted for the green juice until the last pan is emptied of sirup and all are filled with water.

Letters Patent granted to J. V. Harter on the 17th of December, 1861, describe a movable partition provided with an elastic sole to keep it in accurate contact with the bottom. The said Harter uses the movable partition to divide his entire pan into two compartments and to lessen the area and capacity of one of them as the sirup becomes concentrated.

My improvement over the above consists in the use of such a scraper or movable partition having an elastic sole, in connection with a series of pans connected by curved pipes guarded by sliding gates, the movable partitions being employed as the means of transferring the sirup from one pan to another, as hereinbefore explained.

Having thus described my invention, what I claim as new, and desire to secure by Letters Patent, is—

The combination, with the scraper or movable partition I, of the evaporator-pans A, B, and C, curved or bent tubes D E, and gates F and G, when the said parts are all constructed and arranged and operate in the manner and for the purposes herein specified.

ABRAHAM WHITENACK.

Witnesses:
O. F. MAYHEW,
LUTHER R. MARTIN.